(12) United States Patent
Aleksic et al.

(10) Patent No.: US 11,386,889 B2
(45) Date of Patent: Jul. 12, 2022

(54) CONTEXTUAL TAGGING AND BIASING OF GRAMMARS INSIDE WORD LATTICES

(71) Applicant: Google LLC, Mountain View, CA (US)

(72) Inventors: Petar Aleksic, Jersey City, NJ (US); Pedro J. Moreno Mengibar, Jersey City, NJ (US); Leonid Velikovich, New York, NY (US)

(73) Assignee: Google LLC, Mountain View, CA (US)

( * ) Notice: Subject to any disclaimer, the term of this patent is extended or adjusted under 35 U.S.C. 154(b) by 112 days.

(21) Appl. No.: 16/698,280

(22) Filed: Nov. 27, 2019

(65) Prior Publication Data

US 2020/0175969 A1 Jun. 4, 2020

Related U.S. Application Data

(60) Provisional application No. 62/774,507, filed on Dec. 3, 2018.

(51) Int. Cl.
| | |
|---|---|
| *G10L 15/197* | (2013.01) |
| *G10L 15/16* | (2006.01) |
| *G10L 15/18* | (2013.01) |
| *G10L 15/187* | (2013.01) |

(52) U.S. Cl.
CPC .......... *G10L 15/197* (2013.01); *G10L 15/16* (2013.01); *G10L 15/187* (2013.01); *G10L 15/1822* (2013.01)

(58) Field of Classification Search
CPC .................................................. G10L 15/197
See application file for complete search history.

(56) References Cited

U.S. PATENT DOCUMENTS

| | | | | |
|---|---|---|---|---|
| 9,986,394 B1 * | 5/2018 | Taylor | ..................... | H04W 4/14 |
| 10,438,587 B1 * | 10/2019 | Lam | ........................ | G10L 15/22 |
| 10,453,117 B1 * | 10/2019 | Reavely | ............ | G06Q 30/0645 |
| 2001/0041980 A1 * | 11/2001 | Howard | .............. | G10L 15/1822 |
| | | | | 704/270 |
| 2014/0358544 A1 * | 12/2014 | Printz | ..................... | G10L 15/19 |
| | | | | 704/254 |

(Continued)

*Primary Examiner* — Shaun Roberts
(74) *Attorney, Agent, or Firm* — Honigman LLP; Brett A. Krueger; Grant Griffith

(57) ABSTRACT

Methods, systems, and apparatus, including computer programs encoded on a computer storage medium, for implementing contextual grammar selection are disclosed. In one aspect, a method includes the actions of receiving audio data of an utterance. The actions include generating a word lattice that includes multiple candidate transcriptions of the utterance and that includes transcription confidence scores. The actions include determining a context of the computing device. The actions include based on the context of the computing device, identifying grammars that correspond to the multiple candidate transcriptions. The actions include determining, for each of the multiple candidate transcriptions, grammar confidence scores that reflect a likelihood that a respective grammar is a match for a respective candidate transcription. The actions include selecting, from among the candidate transcriptions, a candidate transcription. The actions further include providing, for output, the selected candidate transcription as a transcription of the utterance.

17 Claims, 4 Drawing Sheets

(56) References Cited

U.S. PATENT DOCUMENTS

| | | | |
|---|---|---|---|
| 2015/0012271 A1* | 1/2015 | Peng | G10L 15/08 |
| | | | 704/235 |
| 2015/0127337 A1* | 5/2015 | Heigold | G06N 3/0454 |
| | | | 704/232 |
| 2015/0170020 A1* | 6/2015 | Garimella | G06N 3/082 |
| | | | 706/14 |
| 2015/0228279 A1* | 8/2015 | Biadsy | G10L 15/26 |
| | | | 704/235 |
| 2016/0148612 A1* | 5/2016 | Guo | G06F 40/237 |
| | | | 704/257 |
| 2016/0365092 A1* | 12/2016 | Moreno Mengibar | |
| | | | G10L 15/197 |
| 2017/0177716 A1* | 6/2017 | Perez | G06F 16/90332 |
| 2017/0213551 A1* | 7/2017 | Ji | B60W 50/10 |
| 2018/0053502 A1* | 2/2018 | Biadsy | G10L 15/32 |
| 2018/0068653 A1* | 3/2018 | Trawick | G10L 15/142 |
| 2018/0075847 A1* | 3/2018 | Lee | G06F 16/3329 |
| 2018/0233143 A1* | 8/2018 | Papangelis | G06F 16/3329 |
| 2018/0261216 A1* | 9/2018 | Leeb | G10L 15/1815 |

* cited by examiner

CONTEXTUAL TAGGING AND BIASING OF GRAMMARS INSIDE WORD LATTICES

CROSS-REFERENCE TO RELATED APPLICATION

This application claims the benefit of U.S. Application 62/774,507, filed Dec. 3, 2018, which is incorporated by reference.

TECHNICAL FIELD

This specification generally relates to speech recognition.

BACKGROUND

It is increasingly desired to enable interactions with computers to be performed using speech inputs. This requires developments in input processing, in particular how to program computers to process and analyze natural language data. Such processing may involve speech recognition, which is a field of computational linguistics that enables the recognition and translation of spoken language into text by computers.

SUMMARY

To enable a user to provide inputs to a computing device through speech, a speech input processing system may use context to identify the grammars to apply to candidate transcriptions generated by an automated speech recognizer. Each grammar may indicate a different intent of the speaker or action that the system performs for the same candidate transcription. The system may select a grammar and candidate transcription based on the grammar parsing the candidate transcription, the likelihood that the grammar matches the intent of the user, and the likelihood that the candidate transcription matches what the user said. The system may then perform the action that corresponds to the grammar using the details included in the selected candidate transcription.

In more detail, the speech processing system receives an utterance from a user and generates a word lattice. The word lattice is a data structure that reflects the likely words of the utterance and a confidence score for each word. The system identifies the candidate transcriptions and a transcription confidence score for each candidate transcription from the word lattice. The system identifies the current context that may be based on characteristics of the user, the location of the system, the characteristics of the system, applications running on the system, e.g. a currently active application or an application running in the foreground, or any other similar context data. Based on the context, the system generates a grammar confidence score for the grammars that parse each of the candidate transcriptions. The system may adjust some of the grammar confidence scores in instances where more than one grammar may apply to the same candidate transcription. The system selects a grammar and a candidate transcription based on a combination of the adjusted grammar confidence scores and the transcription confidence scores.

According to an innovative aspect of the subject matter described in this application, a method for processing speech input includes the actions of receiving, by a computing device, audio data of an utterance; generating, by the computing device using an acoustic model and a language model, a word lattice that includes multiple candidate transcriptions of the utterance and that includes transcription confidence scores that each reflect a likelihood that a respective candidate transcription is a match for the utterance; determining, by the computing device, a context of the computing device; based on the context of the computing device, identifying, by the computing device, grammars that correspond to the multiple candidate transcriptions; based on the current context, determining, by the computing device and for each of the multiple candidate transcriptions, grammar confidence scores that reflect a likelihood that a respective grammar is a match for a respective candidate transcription; based on the transcription confidence scores and the grammar confidence scores, selecting, by the computing device and from among the candidate transcriptions, a candidate transcription; and providing, for output by the computing device, the selected candidate transcription as a transcription of the utterance.

These and other implementations can each optionally include one or more of the following features. The actions include determining that two or more of the grammars correspond to one of the candidate transcriptions; and, based on determining that two or more of the grammars correspond to one of the candidate transcriptions, adjusting the grammar confidence scores for the two or more grammars. The computing device selects, from among the candidate transcriptions, the candidate transcription based on the transcription confidence scores and the adjusted grammar confidence scores. The action of adjusting the grammar confidence scores for the two or more grammars includes increasing each of the grammar confidence scores for each of the two or more grammars by a factor. The actions include determining, for each of the candidate transcriptions, a product of the respective transcription confidence score and the respective grammar confidence score. The computing device selects, from among the candidate transcriptions, the candidate transcription based on the products of the transcription confidence scores and the respective grammar confidence scores. The action of determining, by the computing device, the context of the computing device is based on a location of the computing device, an application running in a foreground of the computing device, and a time of day. The language model is configured to identify probabilities for sequences of terms included in the word lattice. The acoustic model is configured to identify a phoneme that matches a portion of the audio data. The actions include performing, by the computing device, an action that is based on the selected candidate transcription and a grammar that matches the selected candidate transcription.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A speech recognition system may use both received speech inputs and a determined context to select the grammars that are used to further process the received speech input to cause a computing device to perform an action. In this way, a speech recognition system may reduce latency in the human-machine interface by applying a limited number of grammars to the candidate transcriptions. The speech recognition system may use a vocabulary that includes all or nearly all words in a language such that the speech recognition system is able to output a transcription when the system receives an unexpected input.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
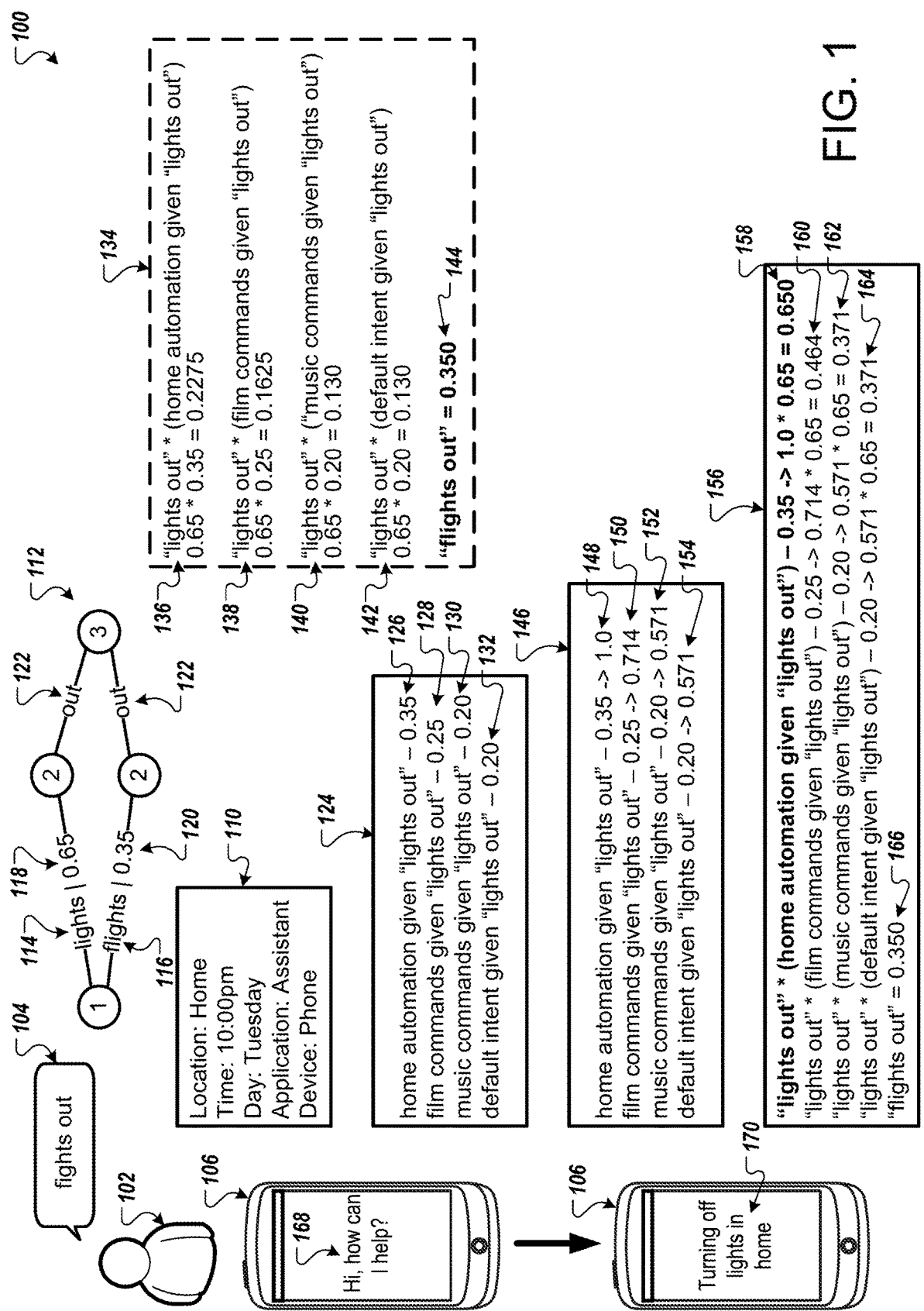
FIG. 1 illustrates an example system that selects a grammar to apply to an utterance based on context.

FIG. 1 illustrates an example system 100 that selects a grammar to apply to an utterance based on context. Briefly, and as described in more detail below, the user 102 speaks utterance 104. The computing device 106 detects the utterance 104 and performs an action 108 in response to the utterance. The computing device 106 may use the context 110 of the computing device 106 to determine the likely intent of the user 102. Based on the likely intent of the user 102, the computing device 106 selects an appropriate action.

In more detail, user 102 speaks utterance 104 in the vicinity of the computing device 106. The computing device 106 may be any type of computing device that is configured to detect audio. For example, the computing device 106 may be a mobile phone, a laptop computer, a wearable device, a smart appliance, a desktop computer, a television, or any other type of computing device that is capable of received audio data. The computing device 106 processes the audio data of the utterance 104 and generates a word lattice 112. The word lattice 112 represents the different combinations of words that may correspond to the utterance and a confidence score for each.

As illustrated in FIG. 1, the user 102 does not speak clearly and says an utterance 104 that sounds similar to "flights out." The computing device 106 detects the audio of the user's speech and uses automated speech recognition to determine what the user 102 said. The computing device 106 applies an acoustic model to the audio data. The acoustic model may be configured to determine the different phonemes that likely correspond to the audio data. For example, the acoustic model may determine that the audio data includes a phoneme for the "f" phoneme, in addition to other phonemes. The computing device 106 may apply a language model to the phonemes. The language model may be configured to identify the likely words and series of words that match the phonemes. In some implementations, the computing device 106 may transmit the audio data to another computing device, for example, a server. The server may perform speech recognition on the audio data.

The language model generates a word lattice 112 that includes different combinations of terms that match the utterance 104. The word lattice includes two words that may be the first word in the utterance 104. The word 114 "lights" may be the first word, or the word 116 "flights" may be the first word. The language model may compute a confidence score that reflects the likelihood that a word in the word lattice is the word that the user spoke. For example, the language model may determine that the confidence score 118 for the word 114 "lights" is 0.65, and the confidence score 120 for the word 116 "flights" is 0.35. The word lattice 112 includes possible words for the second word. In this example, the language model identified only one possible word 122, "out," for the second word.

In some implementations, the computing device 106 may use a sequence-to-sequence neural network, or other type of neural network, in place of the acoustic model and the language model. The neural network may have one or more hidden layers and may be trained using machine learning and training data that includes audio data of sample utterances and transcriptions that correspond to each sample utterance. In this instance, the sequence-to-sequence neural network may generate the word lattice 112 and the confidence scores 118 and 120. The sequence-to-sequence neural network may not generate separate confidence scores for the phonemes and word combinations as an acoustic model and language model would do. Instead, the sequence-to-sequence neural network may generate confidence scores that are a combination of confidence scores for the phonemes generated by the acoustic model and confidence scores for word combinations generated by a language model.

Based on the word lattice 112, the computing device 106 identifies two candidate transcriptions for the utterance 104. The first candidate transcription is "lights out," and the second candidate transcription is "flights out." The confidence score for the first candidate transcription is 0.65, and the confidence score for the second candidate transcription is 0.35. The confidence score for each candidate transcription may be a product of the confidence scores for each of the words in the candidate transcription. The phase "fights out" may be the closest acoustic match to the utterance 104, but based on the language model, the combination of "fight" and "out" is unlikely to occur. Accordingly, "fights out" is not a candidate transcription. In implementations when a neural network is used in place of the acoustic model and the language model, the neural network may not generate separate confidence scores using the acoustic model and the language model.

The computing device 106 may determine the context 110 of the computing device 106. The context 110 may be based on any combination of factors that exist on or around the computing device 106. For example, the context 110 may include that the computing device 106 is located at the home of the user 102. The context 110 may include that the current time is 10:00 pm and the day of the week is Tuesday. The context 110 may include that the computing device 106 is a mobile phone that is executing a digital assistant application in the foreground of the computing device 106.

In some implementations, the context 110 may include additional information. For example, the context 110 may include data related to the orientation of the computing device 106 such as being flat on a table or in the user's hand. The context 110 may include the applications running in the background. The context may include the data displayed on the computing device's screen or audio outputted by the computing device 106 before receiving the utterance 104. For example, the display including the prompt "Hi, how can I help you?" may indicate that the computing device 106 is executing a virtual assistant application in the foreground. The context 110 may include the weather, the identity of the user 102, demographic data of the user 102, and data stored on or accessible by the computing device 106 such as contacts.

The computing device 106 may use the context to select a grammar to apply to the transcription. A grammar may be any structure of words that can be described using a common notation technique, for example, Backus-Naur form. Each grammar may correspond to a specific user intent. For example, the user intent may be to issue a home automation command or a media playing command. One example of a grammar may include a grammar for an alarm. The alarm grammar may define a digit as 0, 1, 2, 3, 4, 5, 6, 7, 8, 9, or 0 using the notation $DIGIT=(0 | 1 | 2 | 3 | 4 | 5 | 6 | 7 | 8 | 9). The alarm grammar may define a time using the notation $TIME=$DIGIT $DIGIT: $DIGIT $DIGIT (am | pm) that indicates the time includes two digits, followed by a colon, followed by a two digits, and followed by "am" or "pm." The alarm grammar may define the mode of the alarm using the notation $MODE=(alarm | timer) that indicates whether the alarm should be in alarm mode or timer mode. Finally, the alarm grammar may define the alarm syntax as $ALARM=set $MODE for $TIME that indicates the user can say "set alarm for 6:00 am" or "set timer for 20:00." The computing device 106 uses the grammar to parse the spoken command or the typed command and identify an action for the computing device 106 to perform. The grammar therefore provides functional data that causes the computing device 106 to operate in a particular way in order to parse the command.

Each grammar may be active for certain contexts. For example, the alarm grammar may be active if the application running in the foreground of the computing device 106 is an alarm application. The alarm grammar may also be active if the application running in the foreground of the computing device is a digital assistant application. Because the likelihood of a user intending to set the alarm while in an alarm application may be higher than a digital assistant application, the computing device 106 may assign a probability of 0.95 to the likelihood of the alarm grammar matching the command and the user's intent if the computing device 106 is running the alarm application and a probability of 0.03 if the computing device 106 is running a digital assistant application.

In the example illustrated in FIG. 1, the computing device 106 determines confidence scores for each grammar based on the different candidate transcriptions that may apply to the grammar. In other words, the computing device 106 identifies the grammars that parse each of the candidate transcriptions. The applied grammars 124 illustrate those grammars that parse the candidate transcription "lights out" and a grammar confidence score that each grammar is the correct grammar for the user's intent. A higher grammar confidence score indicates that the grammar is more likely based on the given transcription and the context. If the transcription is "lights out," then the grammar confidence score 126 for the home automation grammar is 0.35. If the transcription is "lights out," then the grammar confidence score 128 for the film commands grammar is 0.25. If the transcription is "lights out," then the grammar confidence score 130 for the music commands grammar is 0.20. The total of the grammar confidence scores for each transcription should be 1.0. In that case, the computing device 106 may assign the remaining grammar confidence score to a default intent grammar. In this example, if the transcription is "lights out," then the grammar confidence score 132 for the default intent grammar is 0.20. The default intent grammar may not be limited to any particular actions or intent and is able to parse all or nearly all transcriptions.

In some implementations, none of the grammars may be able to parse a particular transcription. In this instance, the default intent grammar applies. For example, there may not be a grammar that parses "flights out." Because of this, if the transcription is "flights out," then the grammar confidence score for the default intent grammar is 1.0.

In some implementations, the computing device 106 selects a grammar and a transcription based on calculating a product of the transcription confidence scores and the grammar confidence scores. Box 134 illustrates the results of selecting a transcription and a grammar based on the product of the transcription confidence scores and the grammar confidence scores. For example, the combined confidence score 136 of "lights out" and the home automation grammar is 0.2275. The combined confidence score 138 of "lights out" and the film commands grammar is 0.1625. The combined confidence score 140 of "lights out" and the music commands grammar is 0.130. The combined confidence score 142 of "lights out" and the default intent grammar is 0.130. The combined confidence score 144 of "flights out" and the default intent grammar is 0.350. In this implementation, the combined confidence score 144 is the highest score. Therefore, using this technique, the computing device 106 may perform an action that corresponds to the command "flights out." This is likely a poor result for the user 102 and may result in providing the transcription "flights out" to a search engine.

If searching the internet for "flights out" is not the intent of the user 102, then the user will have to repeat the utterance 104. Doing so will require the computing device 106 to expend additional computing and power resources processing an additional utterance. The user 102 end up manually inputting the desired command into the computing device 102 which would use additional processing and power resources by activating the screen of the computing device 102 for an additional period of time.

To decrease the likelihood of the computing device 106 performing an action that does not match the user's intent, the computing device 106 may normalize the grammar confidence scores of the applied grammars 124. To normalize the grammar confidence scores of the applied grammars 124, the computing device 106 may compute a factor necessary to increase the highest grammar confidence score to 1.0. In other words, the product of the factor and the highest grammar confidence score should be 1.0. The computing device 106 may then multiply the other grammar confidence scores by the factor to normalize the other grammar confidence scores. The normalization performed by the computing device 106 may be different than traditional probability normalization where probabilities are adjusted to add up to one. Because the highest grammar confidence score is increased to 1.0, the normalized probabilities do not add up to one. The increased confidence scores may represent pseudo-probabilities instead of probabilities in the traditional sense. The normalization processes described elsewhere in this document may also generate similar pseudo-probabilities.

As illustrated in the normalized grammar confidence scores 146, the computing device 106 may identify the grammar confidence score for the home automation grammar as the highest grammar confidence score. To increase the grammar confidence score 126 to 1.0, the computing device multiples the grammar confidence score 126 by 1.0/0.35=2.857. The computing device 106 computes the normalized grammar confidence score 150 by multiplying grammar confidence score 128 by 2.857. The computing device 106 computes the normalized grammar confidence score 152 by multiplying grammar confidence score 130 by 2.857. The computing device 106 computes the normalized grammar confidence score 154 by multiplying grammar confidence score 132 by 2.857. The grammar confidence score for the default intent grammar if the transcription is "flights out" is 1.0 because there are no other grammars that parse the transcription "flights out." Therefore, there is no need to normalize the grammar confidence score for the default intent grammar if the transcription is "flights out" because the score is already 1.0.

Instead of multiplying the grammar confidence scores of box 124 by the transcription confidence scores of the word lattice 112 as illustrated in box 134, the computing device 106 calculates the combined confidence scores using the normalized grammar confidence scores and the transcription confidence scores from the word lattice 112. In particular, the computing device 106 multiples each of the normalized grammar confidence scores by the transcription confidence scores for the respective transcription. If there only the default intent grammar applies to a grammar, then the corresponding transcription confidence score remains unchanged because the transcription confidence score is multiplied by 1.0.

As illustrated in box 156, the computing device 106 computes the combined confidence score 158 by multiplying the transcription confidence score of "lights out" by the normalized grammar confidence score 148 to get a result of 0.650. The computing device 106 computes the combined confidence score 160 by multiplying the transcription confidence score of "lights out" by the normalized grammar confidence score 150 to get a result of 0.464. The computing device 106 computes the combined confidence score 162 by multiplying the transcription confidence score of "lights out" by the normalized grammar confidence score 152 to get a result of 0.371. The computing device 106 computes the combined confidence score 164 by multiplying the transcription confidence score of "lights out" by the normalized grammar confidence score 154 to get a result of 0.371. The computing device 106 maintains the transcription confidence score of "flights out" at 0.350 because there are no grammars that parse the transcription "flights out."

In some implementations, the computing device 106 may adjust the confidence scores in box 156 to account for grammars that may be more likely given the current user context of the current context of the computing device 106. For example, the user 102 may listening to music using computing device 106. Computing device 106 may be a media device that plays songs. In this instance, the computing device 106 may adjust the confidence score 162. The computing device 106 may increase confidence score by multiplying it by a factor, by assigning a preset value to the confidence score, or by another technique. For example, the current probability of a music command is 0.9, based on the context of the user 102 listening to music through the computing device 102, which is a media device. The probability of a music command in box 124 may be confidence score 130, which is 0.20. In this case, the computing device 106 may multiply confidence score 162 by the ratio of 0.9/0.2=4.5. The resulting confidence score 162 may be 0.371*4.5=1.67. The other confidence scores in box 156 may be adjusted with similar ratios for each respective confidence score. For example, the current probability of a home automation command may be 0.04. In this case, the ratio would be 0.04/0.35=0.16, which is 0.04 divided by confidence score 126. The computing device 106 may multiple confidence score 158 by 0.16 to compute an adjusted, or biased, confidence score of 0.10. In this case, the highest confidence score ends up being the one that corresponds to the music command.

In some implementations, this extra adjustment step may affect which candidate transcription the computing device 106 selects. For example, if the candidate transcription "flights out" were the name of a video game and the user is expected to launch a video game, then the computing device 106 may adjust confidence score 166 based on a ratio similar to those computed above and using the probability of the user launching a video game to be 0.8, which is based on the current context of the computing device 106 and/or the user 102.

In some implementations, the computing device 106 may not use this rescoring step and still improve detection of user intent and speech recognition such as when multiple grammars parse the same candidate transcription. This rescoring step may allow the computing device 106 to select different candidate transcriptions that may not be as likely based on the speech recognition confidence scores.

In some implementations, the computing device 106 may use this rescoring step without factoring in the confidence scores of box 124. For example, the computing devices may apply the rescoring step to the transcription confidence scores identified from the word lattice 112. In this instance, the computing device 106 would not perform the adjustments illustrated in both box 146 and box 156.

The computing device 106 selects the grammar and transcription with the highest combined confidence score. For example, the home automation transcription and the transcription "lights out" may have the highest combined confidence score of 0.650. In this case, the computing device 106 executes the "lights out" based on the home automation grammar. The computing device 106 may turn out the lights in the house where the computing device 106 is located or at a home of the user 102. If the computing device 106 used the film command grammar, then the computing device 106 may play the film "Lights Out." If the computing device 106 used the music command grammar, then the computing device 106 may play the song "Lights Out."

As illustrated in FIG. 1, the display of the computing device 106 may indicate the action performed by the computing device 106. Initially, the computing device 106 may display a prompt 168 for a digital assistant. The computing device 106 receives the utterance 104 and indicates by displaying prompt 170 that the computing device 106 is turning off the lights.

Figure 2:
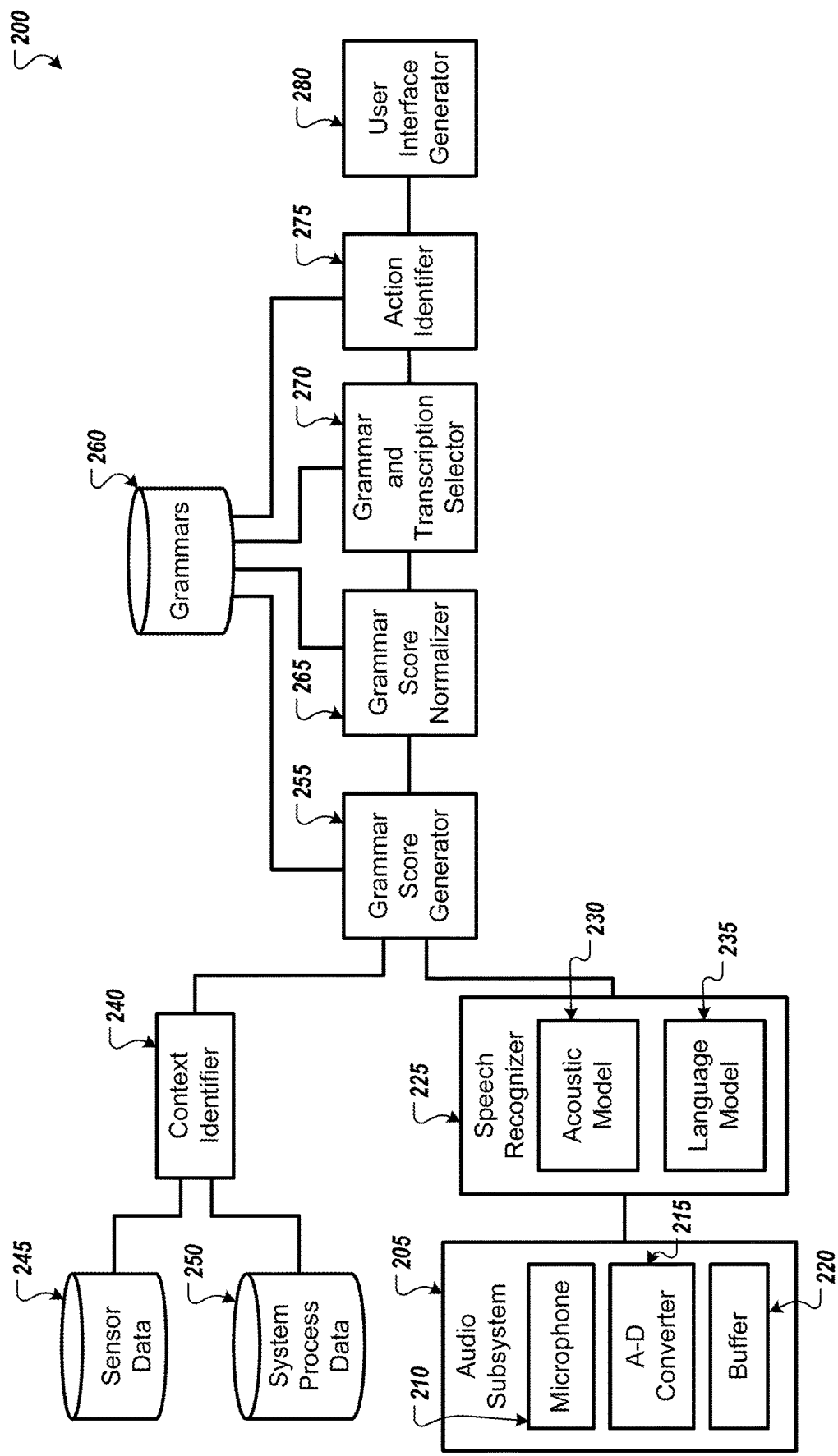
FIG. 2 illustrates components of an example system that selects a grammar to apply to an utterance based on context.

FIG. 2 illustrates components of an example system 200 that selects a grammar to apply to an utterance based on context. The system 200 may be any type of computing device that is configured to receive and process speech audio. For example, the system 200 may be similar to computing device 106 of FIG. 1. The components of system 200 may be implemented in a single computing device or distributed over multiple computing devices. The system 200 being implemented in a single computing device may be beneficial for privacy reasons.

The system 200 includes an audio subsystem 205. The audio subsystem 205 may include a microphone 210, analog to digital converter 215, buffer 220, and various other audio filters. The microphone 210 may be configured to detect sounds in the surrounding area such as speech. The analog to digital converter 215 may be configured to sample the audio data detected by the microphone 210. The buffer 220 may store the sampled audio data for processing by the system 200. In some implementations, the audio subsystem 205 may be continuously active. In this case, the microphone 210 may be constantly detecting sound. The analog to digital converter 215 may be constantly sampling the detected audio data. The buffer 220 may store the latest sampled audio data such as the last ten seconds of sound. If other components of the system 200 do not process the audio data in the buffer 220, then the buffer 220 may overwrite the previous audio data.

The audio subsystem 205 provides the processed audio data to the speech recognizer 225. The speech recognizer provides the audio data as an input to the acoustic model 230. The acoustic model 230 may be trained to identify the likely phonemes that corresponds to the sounds in the audio data. For example, if the user says "set," then the acoustic model 230 may identify the phonemes that correspond to the "s" sound, the "e" vowel sound, and the "t" sound. The speech recognizer 225 provides the identified phonemes as an input to the language model 235. The language model 235 generates a word lattice. The word lattice includes term confidence scores for each of the candidate terms identified by the language model 235. For example, the word lattice may indicate that the first term is likely "set." The language model 235 may not identify any other likely terms for the first term. The language model 235 may identify two possible terms for the second term. For example, the word lattice may include the terms "time" and "chime" as possible second terms. The language model 235 may assign a term confidence score for each term. The term confidence score for "time" may be 0.75, and the term confidence score for "chime" may be 0.25.

The speech recognizer 225 may generate candidate transcriptions based on the word lattice. Each candidate transcription may have a transcription confidence score the reflects a likelihood that the speaker spoke the terms in the transcription. For example, a candidate transcription may be "set time" and have a transcription confidence score of 0.75. Another candidate transcription may be "set chime" and have a transcription confidence score of 0.25.

While the speech recognizer 225 is generating the word lattice, the candidate transcriptions, and the transcription confidence scores, the context identifier 240 may be collecting context data that indicates the current context of the system 200. The context identifier 240 may collect sensor data 245 from any sensors of the system. The sensors may include a location sensor, a thermometer, an accelerometer, a gyroscope, a gravity sensor, the time and day, and any other similar sensor. The sensor data 245 may also include data related to the status of the system 200. For example, the status may include the battery level of the system 200, the signal strength, any nearby devices that the system 200 may be communicating with or aware of, and any other similar state of the system 200.

The context identifier 240 may also collect system process data 250 that indicates the processes that the system 200 is executing. The process data 250 may indicate the memory allocated to each process, the processing resources allocated to each process, the applications that the system 200 is executing, the applications running in the foreground or background of the system 200, the contents of the interface on the display of the system, and any similar process data.

As an example, the context identifier 240 may receive sensor data 245 and system process data 250 indicating that the system 200 is a the user's home, the time is 6:00 pm, the day is Monday, the foreground application is a digital assistant application, and the device is a tablet.

The grammar score generator 255 receives the context of the system 200 from the context identifier 240 and the word lattice from the speech recognizer 225. The grammar score generator 255 identifies the grammars 260 that parse each of the candidate transcriptions of the word lattice. In some instances, none of the grammars 260 parse a candidate transcription. In that case, the grammar score generator 255 gives the default intent grammar a grammar confidence score of 1.0 to the candidate transcription that is not parable by any of the grammars 260.

In some instances, a single grammar 260 may parse a candidate transcription. In that case, the grammar score generator 255 may determine a grammar confidence score for the single grammar assuming that the candidate transcription is the actual transcription. Because the grammar confidence score represents a probability, the grammar confidence score is likely less than 1.0. The grammar score generator 255 assigns the difference between 1.0 and the grammar confidence score to a grammar confidence score for the default intent grammar for the candidate transcription.

In some instances, multiple grammars 260 may parse a candidate transcription. In that case, the grammar score generator 255 may determine grammar confidence scores for each of the grammars assuming that the candidate transcription is the actual transcription. Because the grammar confidence scores represent a collection of probabilities, the sum of the grammar confidence scores is likely less than 1.0. The grammar score generator 255 assigns the difference between 1.0 and the sum of the grammar confidence scores to a grammar confidence score for the default intent grammar for the candidate transcription.

The grammar score normalizer 265 receives the grammar confidence scores for each of the candidate transcriptions and normalizes those grammar confidence scores. In some implementations, the grammar score normalizer 265 only normalizes the grammar confidence scores for grammars other than the default intent grammar. In the case where the grammar score generator 255 generates, for particular candidate transcription, one grammar confidence score for a grammar, the grammar score normalizer 265 increases that grammar confidence score to 1.0. In the case where the grammar score generator 255 generates, for a particular candidate transcription, no grammar confidence scores for any grammars, the grammar score normalizer 265 maintains the grammar confidence score of the default intent grammar at 1.0.

In the case where the grammar score generator 255 generates, for a particular candidate transcription, multiple grammar confidence scores for each of multiple grammars, the grammar score normalizer 265 identifies the highest grammar confidence score for the particular candidate transcription. The grammar score normalizer 265 calculates a factor to increase the highest grammar confidence score to 1.0 such that the product of the factor and the highest grammar confidence score is 1.0. The grammar score normalizer 265 increases the other grammar confidence scores for the same particular transcription by multiplying the factor by each of other grammar confidence scores.

The grammar and transcription selector 270 receives the normalized grammar confidence scores and the transcription confidence scores. Using both the grammar confidence score and the transcription confidence scores, the grammar and transcription selector 270 identifies a grammar and transcription that mostly likely matches the received utterance and the speakers intent by calculating a combined confidence score. The grammar and transcription selector 270 determines each combined confidence score by calculating a product of each normalized grammar confidence scores and the transcription confidence score for the corresponding candidate transcription. In the case where the default intent grammar is the only grammar for a particular candidate transcription, the grammar and transcription selector 270 maintains the transcription confidence score as the combined confidence score. The grammar and transcription selector 270 selects the grammar and the candidate transcription with the highest combined confidence score.

The action identifier 275 receives the selected grammar and selected transcription from the grammar and transcription selector 270 and identifies an action for the system 200 to execute. The selected grammar may indicate the type of action such as setting an alarm, sending a message, playing a song, calling a person, or any other similar action. The selected transcription may indicate the details of the type of action such as how long to set the alarm, whom to send the message to, what song to play, whom to call, or any other similar details for an action. The grammars 260 may include information for the type of action for the particular grammar. The grammars 260 may include information for how the action identifier 275 should parse the candidate transcription to determine the details of the type of action. For example, the grammar may be the $ALARM grammar, and the action identifier 275 parses the selected transcription to determine to set a timer for twenty minutes. The action identifier 275 may execute the action or provide instructions to another portion of the system 200, for example, a processor.

In some implementations, the user interface generator 280 displays an indication of the action or an indication of an execution of the action or both. For example, the user interface generator 280 may display the timer counting down from twenty minutes or a confirmation that the lights are turned off in the house. In some instances, the user interface generator 280 may not provide any indication of the executed action. For example, the action may be adjusting the thermostat. The system 200 may adjust the thermostat without generating a user interface for display on the system 200. In some implementations, the user interface generator 280 may generate an interface for the user to interact with or confirm the action. For example, the action may be to call mom. The user interface generator 280 may generate a user interface for the user to confirm the action of calling mom before the system 200 executes the action.

Figure 3:
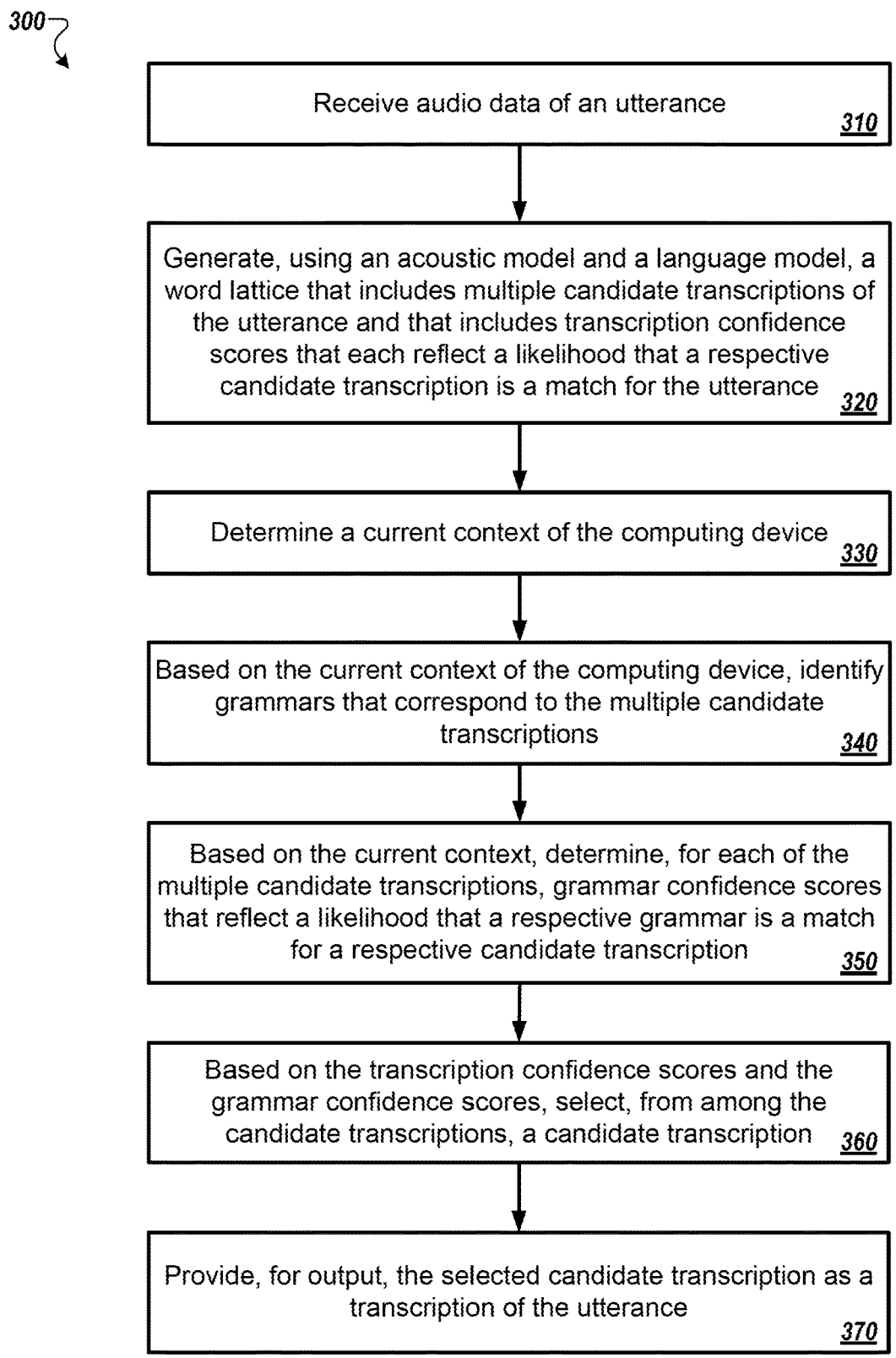
FIG. 3 is a flowchart of an example process for selecting a grammar based on context.

FIG. 3 is a flowchart of an example process 300 for selecting a grammar based on context. In general, the process 300 performs speech recognition on audio and identifies an action to perform based on the transcription of the audio and a grammar that parses the audio. The process 300 normalizes grammar confidence scores to identify the action that the speaker likely intended. The process 300 will be described as being performed by a computer system comprising one or more computers, for example, the computing device 106 of FIG. 1 or system 200 of FIG. 2.

The system receives audio data of an utterance (310). For example, the user may speak an utterance that sound like either "lights out" or "flights out." The system detects the utterance through a microphone or receives audio data of the utterance. The system may process the audio data using an audio subsystem.

The system generates, using an acoustic model and a language model, a word lattice that includes multiple candidate transcriptions of the utterance and that includes transcription confidence scores that each reflect a likelihood that a respective candidate transcription is a match for the utterance (320). The system uses automated speech recognition to generate the word lattice. The automated speech recognition process may include providing the audio data as an input to an acoustic model that identifies different phonemes that match each portion of the audio data. The automated speech recognition process may include providing the phonemes as an input to a language model that generates a word lattice that includes confidence scores for each candidate word in the utterance. The language model selects the words for the word lattice from a vocabulary. The vocabulary may include the words of the language that the system is configured to recognize. For example, the system may be configured to English and the vocabulary includes the words of the English language. In some implementations, the actions of the process 300 do not include limiting the words in the vocabulary that the system is able to recognize. In other words, the process 300 is able to generate a transcription with any of the words in the language that the system is configured to recognize. Because the system is able to recognize each word in the language, the speech recognition process of the system is able to function when the user says something unexpected, as long as it is in the language that the system is configured to recognize.

The system may use the word lattice to generate different candidate transcriptions. Each candidate transcription may include a different transcription confidence score that reflects a likelihood that the user spoke the transcription. For example, the candidate transcription "lights out" may have a confidence score of 0.65 and the candidate transcription "flights out" may have a confidence score of 0.35.

The system determines a context of the system (330). In some implementations, the context is based on the location of the system, an application running in the foreground of the computing device, the demographics of the user, data stored on or accessible by the system such as contacts data, previous user queries or commands, the time of day, the date, the day of the week, the weather, the orientation of the system, and any other similar type of information.

The system, based on the context of the system, identifies grammars that correspond to the multiple candidate transcriptions (340). The grammars may include different structures for different commands that the system is able to execute. For example, the grammars may include a command structure for setting an alarm, playing a movie, performing an internet search, checking the user's calendar, or any other similar action.

The system, based on the current context, determines, for each of the multiple candidate transcriptions, grammar confidence scores that reflect a likelihood that a respective grammar is a match for a respective candidate transcription (350). The grammar confidence scores may be considered a conditional probability of the likelihood of a grammar matching the intent of the speaker based on the context of the system given one of the candidate transcriptions is the transcription of the utterance. For example, the grammar confidence score of the home automation grammar if the transcription is "lights out" may be 0.35. In other words, the conditional probability of the home automation grammar given the transcription is "lights out" is 0.35. The system may generate a grammar confidence score for each of the grammars that parse a candidate transcription. In some implementations because of the context, the system may generate a grammar confidence score only for some of the grammars that parse a candidate transcription. For the sum of the grammar confidence scores for each candidate transcription to add up to 1.0, the system may assign any remaining probability to a default intent grammar.

The system, based on the transcription confidence scores and the grammar confidence scores, selects, from among the candidate transcriptions, a candidate transcription (360). In some implementations, the system normalizes the grammar confidence scores by increasing those candidate transcriptions that match more than one grammar. For each candidate transcription, the system may multiply the highest grammar confidence score by a factor necessary to normalize the grammar confidence score to 1.0. The system may multiple the other grammar confidence scores for the same candidate transcription by the same factor. The system may multiple the normalized grammar confidence scores by the transcription confidence scores to generate combined confidence scores. The system selects the grammar and transcription that has a highest combined confidence score.

The system provides, for output, the selected candidate transcription as a transcription of the utterance (370). In some implementations, the system performs an action based on the grammar and the candidate transcription. The grammar may indicate an action to take. The action may include playing a movie, calling a contact, turning on the lights, sending a message, or any other similar type of action. The selected transcription may include the contact to call, the message to send, the recipient of the message, the name of the movie, or any other similar details.

In some implementations, the system uses the process of tagging the word lattice for a given set of grammars using a Finite-State Transducer (FST). In some implementations, the system may constrain the grammars as the union of all grammars matching the current context. In some implementations, the system may match the grammars offline in advance or dynamically at runtime.

In some implementations, the process 300 may weight the edges of the word lattice. The system may compile the grammars into the weighted finite state transducer that constrains the grammars. The arc weight, or edge weights in this finite state transducer may encode the quantity of the probability of a word for a given grammar, which may be a negative log weight. In some implementations, all of nearly all of the grammars that are relevant to a word lattice may be united together.

The process 300 may continue with the system determining the context dependent probability of each grammar, which may be the probability of the grammar given a context. The system may determine the context dependent probability by the supplied component and the corresponding weight, which may also be encoded into an arc, or edge, in the grammar constrainer, such as its opening decorator arc.

The process 300 may continue with the system clearing the weights of the word lattice. The system may compose the word lattice with the grammar constrainer, which may result in the spans matching grammars to be marked. For example, the spans matching the grammars may be surrounded with opening and closing decorator tags such as <media_commands>play song</media_commands> for the span, or transcription of "play song."

The process 300 may continue normalizing the probabilities. The system generates a copy of the tagged lattice with the decorator tags removed. The system determines and minimizes the arc costs in the tropical semiring, which results in each unique word path encoding the highest probability through that word path. The probability may be the probability of a word path given a grammar multiplied by the probability of the grammar. The probabilities may be inverted by flipping the sign of arc weights in negative log weights are used and this inverted lattice may be composed with the tagged lattice. Composing with an inverted lattice may be effectively the same as performing division by that lattice's weights, in this case, by the highest quantity of the probability of a word path given a grammar multiplied by the probability of the grammar, per each word sequence or path. Therefore, the system may divide the optimal tagged paths' probabilities by themselves, and each may become 1.0. In some implementations, non-optimal paths will receive a lower pseudoprobability, yielding a lattice containing the desired quantity, the pseudoprobability of a grammar for a given word path.

In some implementations, the process 300 may include discarding grammars with low conditional probability by using beam pruning. For example, if there are too many grammars that match an utterance "lights out," where the probability of home automation is 0.32, film commands 0.25, music commands, 0.20, generic search 0.10, online businesses 0.03, social groups, 0.03, and online encyclopedia search 0.02. The system may reduce the processing burden by pruning grammars that are below a threshold or that are below a threshold percentage of the likeliest interpretation, or grammar. For example, the system may prune those grammars that are below a tenth as likely as the likeliest grammar. The system may then remove those grammars that are less than 0.032 for a given transcription. The rationale behind pruning is that low-scoring taggings' probability is so low that no reasonable amount of biasing would result in that interpretation being selected over the more likely interpretations. Pruning may require the system to add a finite state transducer operating to the resulting lattice with the desired pruning weight, which specifies how far behind the best hypotheses a tagging has to be in order to be pruned.

The benefits of the process 300 allows the system to bias grammars directly on a lattice. The process 300 has a lower complexity than other word lattice tagging algorithms. The process 300 solves probability fragmentation caused by tagging ambiguity by implementing max-normalization. The process 300 allows discarding relatively improbable proposed taggings by using beam pruning.

In some implementations, process 300 may extract the n-best hypotheses out of the lattice, and individually tag every hypothesis and possibility optionally recombining them back into a lattice at the end. The system may assume that the tagger is otherwise identical. Doing so may produce identical results with higher latency and/or lower recall. Recall may be lower if the n-best hypotheses after the top N, such as N=100, are dropped, which may help to manage latency. Because the number of distinct sentences in a lattice can be exponential relative to the number of words in it, some workarounds can be exponentially slower in worst cases, unless the aforementioned best-N limitation is used, which may limit how many choices are examined.

Figure 4:
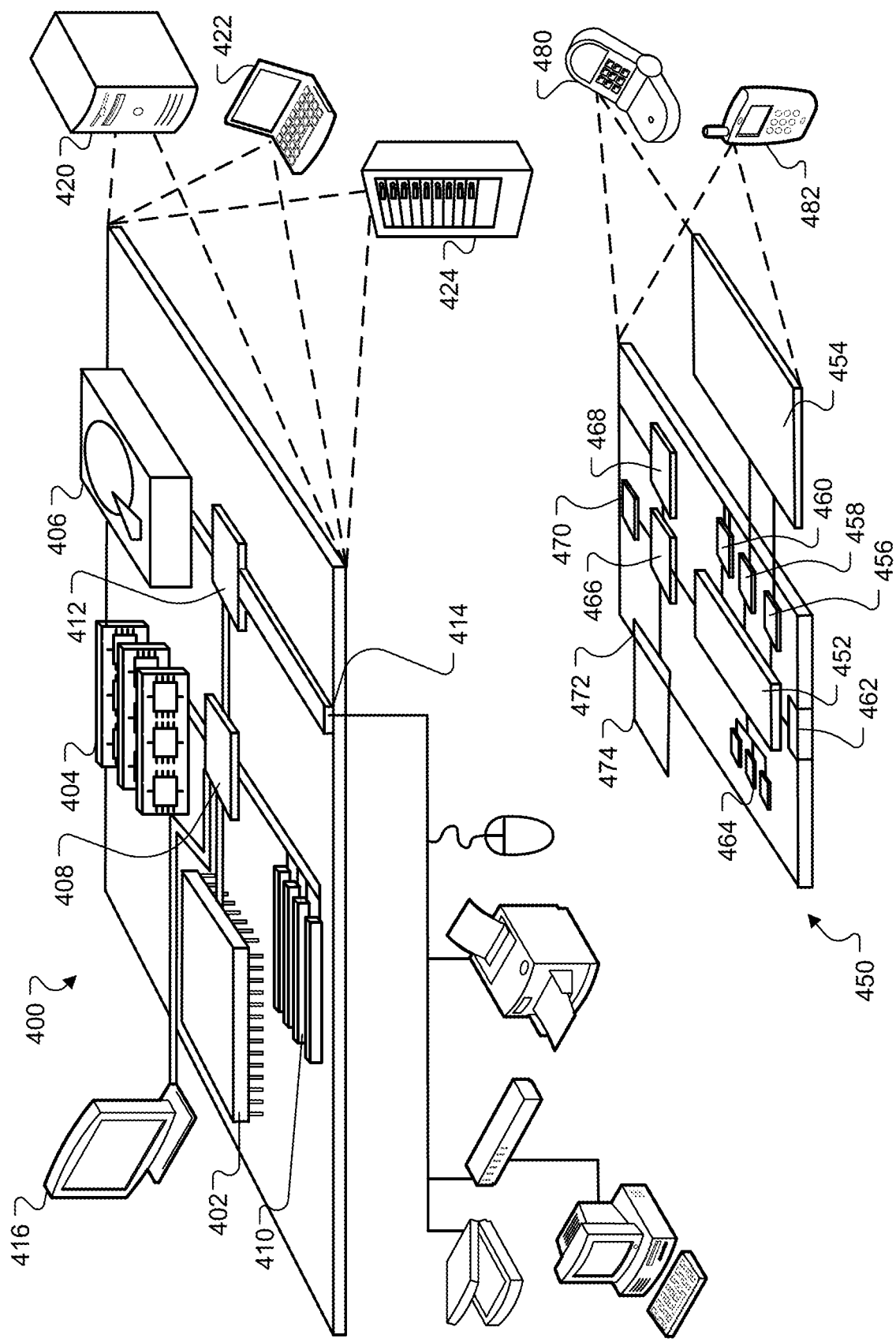
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. In some implementations, the systems and techniques described here can be implemented on an embedded system where speech recognition and other processing is performed directly on the device.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
  receiving, by a computing device, audio data of an utterance;
  generating, by the computing device using a sequence-to-sequence neural network, a word lattice that includes multiple candidate transcriptions of the utterance and that includes transcription confidence scores that each reflect a likelihood that a respective candidate transcription is a match for the utterance;
  determining, by the computing device, a context of the computing device;
  based on the context of the computing device:
    identifying, by the computing device, grammars that correspond to the multiple candidate transcriptions;
    determining, by the computing device and for each of the multiple candidate transcriptions, grammar confidence scores that reflect a likelihood that a respective grammar is a match for a respective candidate transcription;
determining, by the computing device, a normalization factor to increase a highest grammar confidence score of the grammar confidence scores to a value of about 1, and
normalizing, by the computing device, using the normalization factor, the grammar confidence scores determined for each of the multiple candidate transcriptions;
based on the transcription confidence scores and the normalized grammar confidence scores, selecting, by the computing device and from among the candidate transcriptions, a candidate transcription; and
providing, for output by the computing device, the selected candidate transcription as a transcription of the utterance.

2. The method of claim 1, wherein normalizing the grammar confidence scores comprises:
determining that two or more of the grammars correspond to one of the candidate transcriptions; and
based on determining that two or more of the grammars correspond to one of the candidate transcriptions, normalizing the grammar confidence scores for the two or more grammars,
wherein the computing device selects, from among the candidate transcriptions, the candidate transcription based on the transcription confidence scores and the normalized grammar confidence scores.

3. The method of claim 2, wherein normalizing the grammar confidence scores for the two or more grammars using the normalization factor comprises increasing each of the grammar confidence scores for each of the two or more grammars by a factor.

4. The method of claim 1, further comprising:
determining, for each of the candidate transcriptions, a product of the respective transcription confidence score and the respective normalized grammar confidence score,
wherein the computing device selects, from among the candidate transcriptions, the candidate transcription based on the products of the transcription confidence scores and the respective normalized grammar confidence scores.

5. The method of claim 1, wherein determining, by the computing device, the context of the computing device is based on a location of the computing device, an application running in a foreground of the computing device, and a time of day.

6. The method of claim 1, further comprising performing, by the computing device, an action that is based on the selected candidate transcription and a grammar that matches the selected candidate transcription.

7. A system comprising:
one or more computers; and
one or more storage devices storing instructions that are operable, when executed by the one or more computers, to cause the one or more computers to perform operations comprising:
receiving audio data of an utterance;
generating, by the computing device using a sequence-to-sequence neural network, a word lattice that includes multiple candidate transcriptions of the utterance and that includes transcription confidence scores that each reflect a likelihood that a respective candidate transcription is a match for the utterance;
determining a context of the computing device;
based on the context of the computing device:
identifying, by the computing device, grammars that correspond to the multiple candidate transcriptions;
determining, for each of the multiple candidate transcriptions, grammar confidence scores that reflect a likelihood that a respective grammar is a match for a respective candidate transcription;
determining a normalization factor to increase a highest grammar confidence score of the grammar confidence scores to a value of about 1; and
normalizing, using the normalization factor, the grammar confidence scores determined for each of the multiple candidate transcriptions;
based on the transcription confidence scores and the normalized grammar confidence scores, selecting, from among the candidate transcriptions, a candidate transcription; and
providing the selected candidate transcription as a transcription of the utterance.

8. The system of claim 7, wherein normalizing the grammar confidence scores comprises:
determining that two or more of the grammars correspond to one of the candidate transcriptions; and
based on determining that two or more of the grammars correspond to one of the candidate transcriptions, normalizing the grammar confidence scores for the two or more grammars,
wherein the computing device selects, from among the candidate transcriptions, the candidate transcription based on the transcription confidence scores and the normalized grammar confidence scores.

9. The system of claim 8, wherein normalizing the grammar confidence scores for the two or more grammars using the normalization factor comprises increasing each of the grammar confidence scores for each of the two or more grammars by a factor.

10. The system of claim 7, wherein the operations further comprise:
determining, for each of the candidate transcriptions, a product of the respective transcription confidence score and the respective normalized grammar confidence score,
wherein the computing device selects, from among the candidate transcriptions, the candidate transcription based on the products of the transcription confidence scores and the respective normalized grammar confidence scores.

11. The system of claim 7, wherein determining the context of the computing device is based on a location of the computing device, an application running in a foreground of the computing device, and a time of day.

12. The system of claim 7, wherein the operations further comprise performing an action that is based on the selected candidate transcription and a grammar that matches the selected candidate transcription.

13. A non-transitory computer-readable medium storing software comprising instructions executable by one or more computers which, upon such execution, cause the one or more computers to perform operations comprising:
receiving audio data of an utterance;
generating, using a sequence-to-sequence neural network, a word lattice that includes multiple candidate transcriptions of the utterance and that includes transcription confidence scores that each reflect a likelihood that a respective candidate transcription is a match for the utterance;

determining a context of the computing device;
based on the context of the computing device:
- identifying grammars that correspond to the multiple candidate transcriptions;
- determining, for each of the multiple candidate transcriptions, grammar confidence scores that reflect a likelihood that a respective grammar is a match for a respective candidate transcription;
- determining a normalization factor to increase a highest grammar confidence score of the grammar confidence scores to a value of about 1; and
- normalizing, using the normalization factor, the grammar confidence scores determined for each of the multiple candidate transcriptions;

based on the transcription confidence scores and the normalized grammar confidence scores, selecting, from among the candidate transcriptions, a candidate transcription; and providing the selected candidate transcription as a transcription of the utterance.

14. The medium of claim 13, wherein normalizing the grammar confidence scores comprises:
- determining that two or more of the grammars correspond to one of the candidate transcriptions; and
- based on determining that two or more of the grammars correspond to one of the candidate transcriptions, normalizing the grammar confidence scores for the two or more grammars, wherein the computing device selects, from among the candidate transcriptions, the candidate transcription based on the transcription confidence scores and the normalized grammar confidence scores.

15. The medium of claim 13, wherein the operations further comprise:
- determining, for each of the candidate transcriptions, a product of the respective transcription confidence score and the respective normalized grammar confidence score, wherein the computing device selects, from among the candidate transcriptions, the candidate transcription based on the products of the transcription confidence scores and the respective normalized grammar confidence scores.

16. The medium of claim 13, wherein determining the context of the computing device is based on a location of the computing device, an application running in a foreground of the computing device, and a time of day.

17. The medium of claim 13, wherein the operations further comprise performing an action that is based on the selected candidate transcription and a grammar that matches the selected candidate transcription.

* * * * *